UNITED STATES PATENT OFFICE.

RICHARD V. MATTISON, JR., OF UPPER DUBLIN TOWNSHIP, MONTGOMERY COUNTY, PENNSYLVANIA.

CEMENT STRUCTURAL MATERIAL.

1,355,406.      Specification of Letters Patent.      Patented Oct. 12, 1920.

No Drawing. Application filed November 30, 1915, Serial No. 64,271. Renewed March 2, 1920. Serial No. 362,744.

*To all whom it may concern:*

Be it known that I, RICHARD V. MATTISON, Jr., residing in Upper Dublin township, in the county of Montgomery and State of Pennsylvania, have invented certain new and useful Improvements in Cement Structural Materials, whereof the following is a specification.

My invention has for its object to produce structural blocks, paving bricks, flue linings, floor tiles, roof tiles and slates, and similar materials, such as are now commonly made from clay, but with a much greater strength to resist crushing or shearing strains. In order that such a product may be produced at a sufficiently low cost, to be commercially available, it is essential that the materials shall be inexpensive, and that the ingredients when mixed, and prior to their having set, shall have that peculiar plastic consistency which enables them to be worked continuously in a pug mill and Auger machine, or other suitable brick or block making machinery.

Cement concrete does not in itself possess these qualities, nor is the resulting block as strong as that which I produce.

According to my invention, I obtain this desirable result by mixing with ordinary Portland or hydraulic cement a proper quantity of ground fibrous serpentine rock.

In asbestos quarries after the fibrous asbestos, which is adapted for various uses in the arts, has been removed from the ground rock by suction and screening in the manner well known in the art, there remains a very large quantity of ground fibrous serpentine rock, consisting of a mixture of ground quartz, feldspar, silica, &c., with a great number of particles of fibrous serpentine so small, and with fibers so short, that notwithstanding their fibrous structure, they have hitherto been deemed to have no utility, in the arts.

This ground fibrous serpentine has, therefore, heretofore been thrown away, and has accumulated in very large quantities as a refuse material, in the neighborhood of quarries of asbestos rock. The microscopic fibers of asbestos which compose the greater part of this ground fibrous serpentine, although probably averaging not much more than one-thousandth of an inch in length, are as I have discovered capable, when mixed with cement, of imparting to the cementitious mixture very different qualities from those possessed by ordinary cement concrete, in which a different character of aggregate is present, for notwithstanding the shortness of these fibers, they have a binding effect upon the particles of the cement which makes it stronger and tougher than other kinds of cement concrete. The shorter the fibers the more intimate the mixture and the more thoroughly do the fibers intermingle. Furthermore, when this ground fibrous serpentine is mixed with cement and a proper quantity of water, there results a peculiarly, tenacious plastic mass, which has the property of being worked in a pug-mill and Auger machine, as clay products are worked, a thing which has hitherto been deemed impossible in cement products.

The ground fibrous serpentine in addition to very short particles of asbestos, contains a considerable quantity of ground quartz, and the addition of this to the cement increases its hardness, and thus tends to give to my product this desired quality in addition to great toughness and strength.

In the practice of my invention, I take about equal parts of Portland or hydraulic cement and ground fibrous serpentine, and combine them intimately with a sufficient quantity of water in a concrete mixer, or by other proper mixing machinery. Depending alike upon the quality of the ground fibrous serpentine, or upon the ultimate uses to which the manufactured article is desired to be put, the proportions of these materials may be much varied.

This structure, having about the consistency of wet plastic clay, is run into a pug mill and Auger machine, from whence it emerges in the form of a continuous plastic stream, of any desired cross-section. Thus emerging, it is cut off into pieces of the proper length, carried away on a conveyer, subjected to additional pressure or not as may be deemed necessary, and allowed to dry and set.

It will be understood that when I speak in my claim of ground fibrous serpentine, I mean the finely ground refuse containing very small particles of asbestos fiber, and usually a certain quantity of ground quartz, feldspar and other mineral which remains after all the fibrous asbestos or asbestos pulp, which is deemed useful in the art, has been removed from the quarried and crushed asbestos bearing rock.

Having thus described my invention, I claim:

An asbestos cement structural material composed of Portland cement and ground fibrous serpentine, the latter including microscopic fibers of asbestos and a considerable portion of ground quartz, substantially as described.

In testimony whereof I have hereunto signed my name, at Philadelphia, Pennsylvania, this twenty-ninth day of November, 1915.

RICHARD V. MATTISON, Jr.

Witnesses:
JAMES H. BELL,
E. L. FULLERTON.